United States Patent
Brooks et al.

(10) Patent No.: US 9,742,572 B2
(45) Date of Patent: Aug. 22, 2017

(54) UPSTREAM RF INPUT LEVEL SCALING

(71) Applicant: Time Warner Cable Enterprises LLC, New York, NY (US)

(72) Inventors: Paul D. Brooks, Weddington, NC (US); Peter Wolff, Bradenton, FL (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 0 days.

(21) Appl. No.: 14/984,318

(22) Filed: Dec. 30, 2015

(65) Prior Publication Data
US 2017/0195126 A1    Jul. 6, 2017

(51) Int. Cl.
    *H04L 12/10*    (2006.01)
(52) U.S. Cl.
    CPC .................... *H04L 12/10* (2013.01)
(58) Field of Classification Search
    CPC ........................................ H04L 12/10
    USPC ........................................ 375/257
    See application file for complete search history.

(56) References Cited

U.S. PATENT DOCUMENTS

| 2002/0042256 A1* | 4/2002 | Baldwin | H03D 3/008 455/232.1 |
| 2012/0163201 A1* | 6/2012 | Williams | H04N 7/102 370/252 |

\* cited by examiner

*Primary Examiner* — Michael Neff
(74) *Attorney, Agent, or Firm* — The Marbury Law Group, PLLC

(57) ABSTRACT

Embodiments include systems and methods for scaling power level of an upstream signal by a device processor of a head-end device in a communication network. In embodiments, the device processor may determine a power level of the signal received at the head-end device from a client device. The device processor may determine a difference between the power level of the received signal and a target power level of an analog-to-digital converter of the head-end device, and may adjust the power level of the received signal at the head-end device based on the determined difference. In embodiments, the device processor may determine a power level of an upstream signal to be received by the head-end device, may determine a difference between the power level of the received signal and the target power level, and may adjust the power level of a received signal at the head-end device based on the determined difference.

36 Claims, 9 Drawing Sheets

UPSTREAM RF INPUT LEVEL SCALING

BACKGROUND

Hybrid Fiber Coaxial (HFC) cable networks are used to provide an increasingly complex and bandwidth-intensive variety of services, including multimedia entertainment streaming, 100+ Mbps speeds for data services, and support for multiscreen services. An HFC cable network may provide a high speed communication link between one or more client devices, such as cable modems, and a head-end device, such as a Converged Cable Access Platform (CCAP) device (e.g., to a radio frequency (RF) input port of a head-end device). These communication links may utilize a long loop Automatic Level Control (ALC) system to individually adjust each client device's transmit power level for adaptation to location-specific network characteristics such that each modem is received at the head-end device at a target power level.

A client device may be unable to transmit at the desired power level for a variety of reasons. As a result, the head-end device may receive a signal from such client device at a power level lower or higher than the target level. consequently The head-end device may receive a signal suffering from degradation and errors. For example, one the one hand, when the received signal level is below the target level, thermal noise and/or quantization noise may disrupt the received signal. On the other hand, when the received signal is above the target level, signal errors may arise from clipping and/or intermodulation distortion.

SUMMARY

The various embodiments include systems and methods of scaling a power level of an upstream signal that may be received at a head-end device from a client device. Various embodiments may include determining a power level of a signal received at a head-end device from a client device, determining a difference between the power level of the received signal and a target power level of an analog-to-digital converter of the head-end device, and adjusting the power level of the received signal at the head-end device based on the determined difference. Some embodiments may further include providing the received signal with the adjusted power level to the analog-to-digital converter of the head-end device.

In some embodiments, determining the difference between the power level of the received signal and the target power level of the analog-to-digital converter of the head-end device may include determining the difference between the power level of a burst of the received signal and the target power level of the analog-to-digital converter of the head-end device. In some embodiments, the difference between the power level of a burst of the received signal and the target power level of the analog-to-digital converter of the head-end device may include determining the difference between the power level of each of a plurality of bursts of the received signal and the target power level of the analog-to-digital converter of the head-end device on a burst-by-burst basis. In some embodiments, adjusting the power level of the received signal at the head-end device based on the determined difference may include adjusting the power level of a burst of the received signal at the head-end device based on the determined difference. In such embodiments, adjusting the power level of a burst of the received signal at the head-end device based on the determined difference may include adjusting the power level of each of a plurality of bursts of the receive signal on a burst-by-burst basis based on the determined difference.

In some embodiments, determining the difference between the power level of the received signal and the target power level may include comparing the determined power level of the received signal to the target power level of the analog-to-digital converter. In such embodiments, comparing the determined power level of the received signal and the target power level of the analog-to-digital converter may include comparing the determined power level of each of a plurality of bursts of the received signal on a burst-by-burst basis to the target power level of the analog-to-digital converter.

In some embodiments, determining the power level of the signal received at the head-end device from the client device may include determining a power level over time of one or more previously-received bursts of the received signal, wherein determining a difference between the power level of the received signal and a target power level may include determining a difference between the power level over time of the received signal and the target power level. In some embodiments, adjusting the power level of the receive signal at the head-end device based on the determined difference may include adjusting the power level of the receive signal at the head-end device based on the determined difference between the power level over time of one or more previously-received bursts of the received signal and the target power level.

In some embodiments, determining a power level of a signal received at a head-end device from a client device may include determining a power level of each of a plurality of signals, wherein each of the plurality of signals is received from one of a plurality of client devices. In such embodiments, determining a difference between the power level of the received signal and a target power level may include determining a difference between the power level of each received signal and a target power level, and adjusting the power level of the received signal at the head-end device based on the determined difference may include adjusting the power level of each received signal individually at the head-end device based on the determined difference of each signal.

Various embodiments may also include determining a power level of an upstream signal to be sent from a client device to a head-end device, determining a difference between the power level of the upstream signal and a target power level of an analog-to-digital converter of the head-end device, receiving the upstream signal from the client device at the head-end device, and adjusting a power level of the received signal at the head-end device based on the determined difference between the power level of the upstream signal and the target power level.

Some embodiments may further include receiving one or more scheduling requests from the client device at the head-end device, wherein determining a power level of an upstream signal to be sent from the client device to the head-end device may include determining the power level of the upstream signal to be sent from the client device to the head-end device based on the one or more scheduling requests. In some embodiments, determining the difference between the power level of the upstream signal and the target power level of the analog-to-digital converter may include comparing the determined power level of the upstream signal to the target power level of the analog-to-digital converter.

Some embodiments may further include determining a power level of a signal received at the head-end device from the client device, and determining a difference between the power level of the received signal and the target power level of the analog-to-digital converter, wherein adjusting the power level of the received signal at the head-end device based on the determined difference between the power level of the upstream signal and the target power level may include adjusting the power level of the received signal at the head-end device based on one or more of the determined difference the between the power level of the upstream signal and the target power level, and the determined difference between the power level of the received signal and the target power level.

In some embodiments, determining the power level of the upstream signal to be sent from a client device to a head-end device may include determining a power level of a plurality of upstream signals, wherein each upstream signal is to be sent from one of a plurality of client devices, determining the difference between the power level of the upstream signal and the target power level of the analog-to-digital converter of the head-end device may include determining a difference between the power level of each received signal and the target power level of the analog-to-digital converter, and adjusting the power level of the received signal at the head-end device based on the determined difference between the power level of the upstream signal and the target power level may include adjusting the power level of each received signal individually at the head-end device based on the determined difference of each signal.

In some embodiments, determining a power level of an upstream signal to be sent from a client device to a head-end device may include receiving a maximum transmit power capability of the client device, and determining a power level of one or more previously-received upstream signals, wherein determining a difference between the power level of the upstream signal and a target power level of an analog-to-digital converter of the head-end device may include determining whether the maximum transmit power capability of the client device and the power level of the one or more previously-received upstream signals are substantially the same, determining a value to adjust the power level of the received upstream signal in response to determining that the maximum transmit power capability of the client device and the power level of the one or more previously-received upstream signals are substantially the same, and wherein adjusting a power level of the received signal at the head-end device based on the determined difference between the power level of the upstream signal and the target power level comprises adjusting the power level of the received signal using the determined value.

Various embodiments may also include determining a power level of an upstream signal to be sent from a client device to a head-end device, determining a difference between the power level of the upstream signal and a target power level of an analog-to-digital converter of the head-end device, receiving the upstream signal from the client device at the head-end device, determining a power level of the received signal, determining a difference between the power level of the received signal and the target power level of the analog-to-digital converter of the head-end device, and adjusting the power level of the received signal at the head-end device based on one or more of the determined difference between the power level of the upstream signal and the target power level, and the determined difference between the determined power level of the received signal and the target power level.

Further embodiments may include a head-end device including a signal input, an analog-to-digital converter, a level scaler, and a controller coupled to the signal input, the analog-to-digital converter, and the level scaler, and configured with processor-executable instructions to perform operations of the methods described above. Further embodiments may include a head-end device including means for performing functions of the methods described above. Further embodiments may include processor-readable storage media on which are stored processor executable instructions configured to cause a controller of a head-end device to perform operations of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
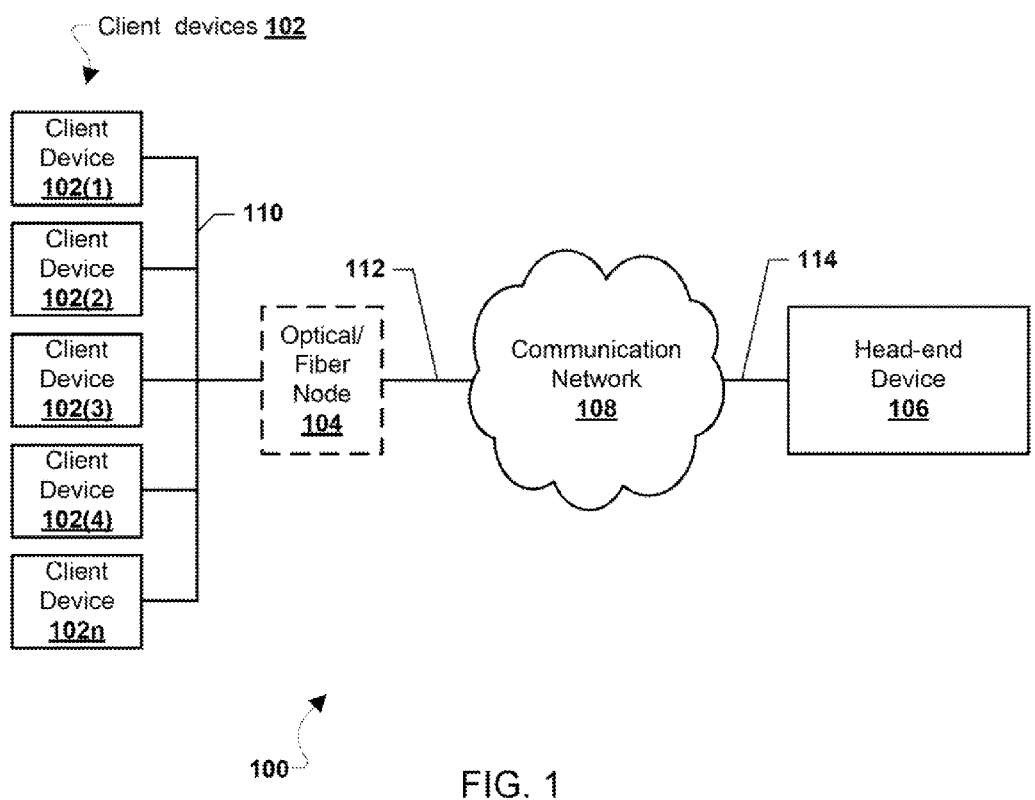
FIG. 1 is a communication system block diagram of a communication system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of various embodiments or the claims.

The terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The Converged Cable Access Platform (CCAP) is a multi-service broadband and broadcast access architecture that may support products and services over communication networks such as hybrid fiber-coaxial (HFC) networks. CCAP may combine a variety of network functionalities and systems into unified platform, such as functions and/or devices of an Edge QAM (EQAM) system with functions and/or devices of a Cable Modem Termination System (CMTS).

An HFC network may provide a high speed communication link between one or more client devices, such as cable modems, and a head-end device in the network, such as CCAP device, a CMTS device, or another head-end device. The communication links of the HFC network may utilize a long loop Automatic Level Control (ALC) system to individually adjust each client device's transmit power level for adaptation to location-specific network characteristics such that signals from each modem is received at the head-end device (e.g., at a radio frequency (RF) input port) at a target power level. In some cases, a client device may be unable to transmit at the desired power level, or communication link conditions may adversely affect a client device signal. The head-end device may thus receive a signal from such client device at a power level lower or higher than the optimal target level, which may cause signal degradation and errors at the head-end device. In some cases, limitations of the head-end device, such as limitations in the head-end device's dynamic range, may cause signal reception errors when the client device's transmit power level is not properly matched to the expected received target power level at the head-end device.

In various embodiments, a head-end device may be configured to scale the power level of an upstream signal from a client device after its receipt by the head-end device, but before the upstream signal is converted by an analog-to-digital (A/D) converter component of the head-end device. As one example, an A/D converter used in a head-end device may employ 12 bits of resolution, where each bit may represent 6 dB of power; the 12 bits thus providing a 72 dB range. A client device signal transmit power may vary over time, and may provide instantaneous peak power levels (e.g., Peak-to-Average Power Rate, or PAPR) that may exceed can average power by many dB. In some cases, a client device may not be able to rapidly and/or sufficiently attenuate its transmit power, and a head-end device may receive a signal from the client device with a received power level that falls outside a target power level and/or power level range. In some cases, 3 bits may be provided for 24 dB of instantaneous peak headroom over and above the desired and expected target receive power level, leaving 48 dB of resolution for encoding of signals that are at the target level.

The A/D converter may function properly when the A/D converter receives a signal at target power level, or within a target power range. However, if the head-end device receives a signal with average power level(s) significantly below the target level, the receive signal may not include sufficient resolution (e.g., bits) for the A/D converter to properly encode the received signal without inadvertently introducing errors. For example, when the received signal power level is below the target power level, thermal noise and/or quantization noise may disrupt the received signal. Conversely, when the received signal power level is above the target power level, signal errors may arise from clipping and/or intermodulation distortion. This encoding problem may be exacerbated at higher signal modulation densities (for example, as may be used with increasingly advanced systems such Data Over Cable Service Interface Specification (DOCSIS) 3.1 and future generations).

Additionally, the head-end device receiver circuitry may include gain stage(s) and an addressable attenuator. Conventionally, the attenuator may be adjusted to a fixed value (e.g., via a software configuration). When received signal power is relatively low, the gain stage(s) may add proportionally greater amounts of noise power. Alternatively, when a received signal powers relatively high the gain stage(s) may add proportionally greater amounts of non-linear (intermodulation) distortion.

Certain control mechanisms exist that may enable a head-end device to send a request or instruction to the client device to adjust the client device's transmit power. However, in some cases, a client device may be unable to further increase its transmit power such that the transmitted/received signal is within the range of the target power level. As a result, the head-end device may receive a signal from the client device that is below the target power level.

Various embodiments are disclosed that provide head-end devices and methods that enable a processor of a head-end device scale a power level of an upstream signal to mitigate signal reception errors caused by a mismatch in a power level of the receive signal and a target power level of the head-end device. Various embodiments may enable the head-end device to successfully receive a wider dynamic range of upstream signals.

In some embodiments, the head-end device may determine the power level of signal received from a client device (e.g., an upstream signal). The head-end device may determine a difference between the power level of the received signal and a target power level of the head-end device (which may be a predetermined power level), the head-end device may adjust the power level of the received signal based on the determined difference.

In some embodiments, the head-end device may adjust the power level of the received signal using a level scaler, such as a variable attenuator, a gain device, or another similar device. The signal may include one or more bursts, and the head-end device may adjust the power level of the received signal (e.g., by adjusting a value of the level scaler) prior to a burst, or during a burst. For example, the head-end may detect the power level of an incoming burst, and may control the scaling device (e.g., a level scaler) to adjust (e.g., scale) the signal power level of the received signal higher or lower based on the target power level. In some embodiments, the head-end may impose a delay on the received signal to provide time to detect the power level of the received signal and to control the scaling device.

In some embodiments, the client device may send a request to the head-end device for a grant of bandwidth to transmit the upstream signal, and the client device may receive from the head-end device a grant of bandwidth as well as a timing and a duration to transmit one or more bursts of the upstream signal. In some embodiments, the head-end device may determine the power level of the upstream signal based on one or more messages from the client device. In some embodiments, the head-end device may determine (and may store) an expected power level of a signal from a specific client device based on a prior burst (e.g., by matching a device identifier such as an IP or MAC address to the historical data (e.g., the prior burst)). In such embodiments, the head-end device may adjust the level scaler in anticipation of a burst from the client device, to adjust the level scaler on a "just-in-time" basis for the anticipated burst. The head-end device may subsequently restore the level scaler to a prior value.

Further, the head-end device may control the scaling device to adjust the upstream signal when the head-end device receives the upstream signal. The head-end device may adjust the received signal power level higher or lower based on the target power level of the head-end device. In some embodiments, the head-end device may also obtain historical information about the power level capabilities of the client device, for example, based on past messages that the head-end device has received from the client device, and the head-end device may use the historical information about the client device to adjust the received signal power level of the upstream signal.

In some embodiments, the head-end device may anticipate bursts from two or more client devices simultaneously, and the head-end device may instruct the "higher powered" device (e.g., a client device transmitting at a higher power level than one or more other client devices) to decrease its transmit power for the duration of a burst (e.g., for a the duration of a burst time interval) that is shared with a lower power capable device. The head-end device may instruct the client device to decrease its transmit power for an entire burst time interval, or for a portion of the burst that overlaps in time with a burst from one or more other client devices that are transmitting at a relatively lower power level. In such embodiments, the head-end device may adjust the power levels of signals from two or more client devices (e.g., RF burst channels) to decrease difference(s) between the power levels of signals from different client devices, to improve receiver (e.g., head-end device) performance. In some embodiments, when the head-end device anticipates bursts at different power levels from two or more client devices simultaneously, the head-end may instruct two or more client devices to adjust their respective transmit power levels to decrease a difference between the transmit power levels. The client device may base such instructions on a target power level of the head-end device, to instruct the client devices to converge their respective transmit power levels on the target power level of the head-end device. For example, the head-end device may instruct a first client device transmitting at a relatively higher power level to decrease its transmit power level, and the head-end device may instruct a second client device transmitting at a relatively lower power level to increase its transmit power level. The head-end device may thus "split the difference" among client devices scenarios in which two or more client devices send simultaneous bursts at different power levels.

Various embodiments may be implemented in head-end devices that may operate within a variety of communication systems. FIG. 1 illustrates a communication system 100 suitable for use with various embodiments. One or more client devices 102 (e.g., client devices 102(1), 102(2), 102(3), 102(4), . . . 102n) may communicate with a head-end device 106 via an optional optical/fiber node 104 and a communication network 108 (e.g., an access network). The client devices 102 may request and/or receive data (which may include audio, video, multimedia, and other data traffic) from the head-end device 106 via the communication network 108. Each client device 102 may communicate with the optional optical/fiber node 104 through a communication link 110. Each client device 102 may include customer premises equipment (CPE), which may include a router, a modem, or another similar device.

The optical/fiber node 104 may communicate with the communication network 108 through a communication link 112. The optical/fiber node 104 may include a network device that enables the reception of data from and/or distribution of data to the client devices 102. The head-end device 106 may communicate with the communication network 108 through a communication link 114. The head-end device 106 may receive an upstream signal from one or more client devices 102 via the optical/fiber node 104 and the communication network 108 and may adjust the power level of the received upstream signal based on a target power level of the head-end device 106. In some embodiments, the head-end device 106 may receive a separate upstream signal from each of the one or more client devices.

The communication links 110, 112, and 114 may include wired and/or wireless communication links. Wired communication links may include coaxial cable, optical fiber, and other similar communication links, including combinations thereof (for example, in an HFC network). Wireless communication links may include a plurality of carrier signals, frequencies, or frequency bands, each of which may include a plurality of logical channels. Each of the communication links 110, 112, 114, may employ a communication protocol to structure and carry information. For example, wired communication links may utilize a protocol such as Data Over Cable Service Interface Specification (DOCSIS). As another example, wireless communication link may utilize one or more wireless communication protocols such as 3GPP Long Term Evolution (LTE), Global System for Mobility (GSM), Worldwide Interoperability for Microwave Access (WiMAX), Code Division Multiple Access (CDMA), Wideband CDMA (WCDMA), and other such communication protocols.

Figure 2:
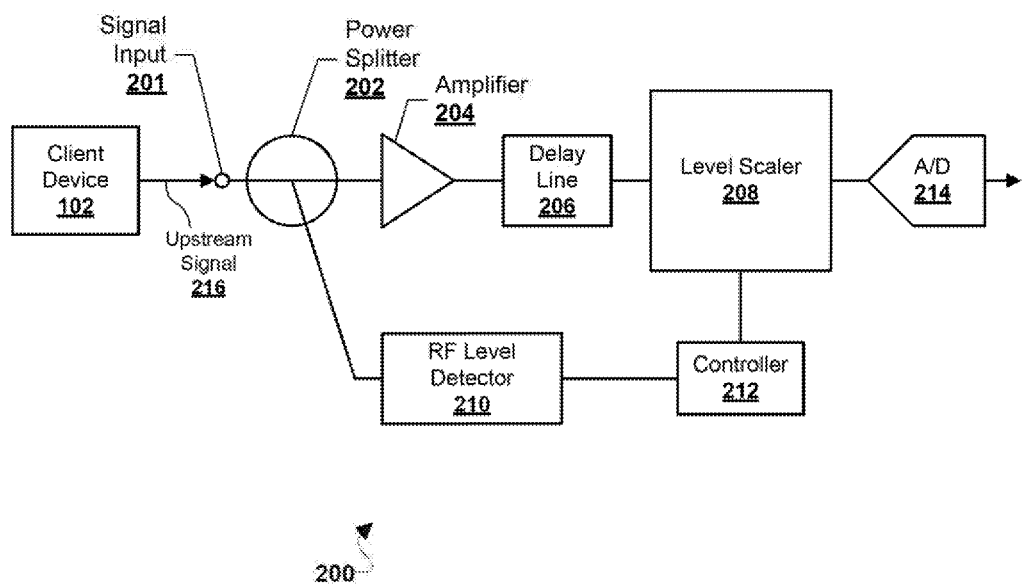
FIG. 2 is a block diagram illustrating a head-end device in a communication system according to various embodiments.

FIG. 2 is a block diagram illustrating a head-end device 200 in a communication system according to various embodiments. With reference to FIGS. 1 and 2, in various embodiments, the head-end device 200 may be similar to the head-end device 106. The head-end device 200 may include a signal input 201, a power splitter 202, an amplifier 204, an delay line component 206, a level scaler 208, an RF level detector 210, a controller 212 (which may include one or more processors), and an A/D converter 214.

The signal input 201 may receive an upstream signal 216 from a client device 102. The signal input 201 may include an RF signal input port or another similar input port to receive the upstream signal 216 from a client device 102. The power splitter 202 may receive the upstream signal 216 from the signal input 201.

The power splitter 202 may communicate with the RF level detector 210, which may determine a power level of the received upstream signal 216. The determined power level may be based on, for example, an average power of a single carrier, a peak power of a single carrier, an average power of all carriers present in a passband, a peak power of all such carriers, or another power level metric.

The RF level detector 210 may provide the determined power level of the upstream signal the controller 212. The controller 212 may compare the detected power level of the upstream signal to a target power level based on the determined power level of the upstream signal 216, and the controller 212 may provide one or more instructions to the level scaler 208 to adjust the power level of the upstream signal 216. The level scaler 208 may include a variable attenuator, a gain device, a controllable amplifier or a variable amplifier, a switch that may include a discrete number of power levels, or another similar device, including combinations thereof, that may scale (e.g., adjust) the upstream signal 216 based on the target power level of A/D converter 214. In some embodiments, the target power level may be a power level range (e.g., including a minimum target power level and a maximum target power level).

The power splitter 202 may also provide the upstream signal 216 to the amplifier 204 for amplification of the received upstream signal 216. In some embodiments, amplifier 204 may provide the amplified signal to the delay line 206, which may delay the signal for a period of time (e.g., a lookahead time or time period) before providing the signal to the level scaler 208. The signal delay may provide a period of time in which to determine a power level of the received upstream signal 216, to compare the power level of the received signal to a target power level of the head end device, and to provide one or more instructions to the level scaler 208. In various embodiments, the level of delay provided may be relatively brief to avoid adding latency to the upstream signal 216.

The components of the head-end device 200 may rapidly determine and adjust the power level of the received upstream signal 216. In some embodiments, the RF level detector 210 may determine the power level of the upstream signal 216 as received at the power splitter 202 and may provide the determined power level to the controller 212. Further, the controller 202 may rapidly determine a difference between the power level of the received signal and a target power level of the head-end device. The target power level may include a target power level of the A/D converter 214.

When the upstream signal 216 is provided to the A/D converter 214 with a power level that is higher or lower than the target power level, the A/D converter 214 may degrade the upstream signal 216 through its analog-to-digital conversion. In some embodiments, the controller 212 may rapidly control the level scaler 208 to adjust the power level of the upstream signal 216 based on the determined power level of the received signal and the target power level of the A/D converter 214. In some embodiments, the controller 212 may control the level scaler 208 to adjust the power level of the received signal based on the determined difference to decrease the determined difference between the power level of the received upstream signal 216 and the target power level. For example, the controller 212 may control the level scaler 208 to adjust the power level of the received signal based on the determined difference such that the power level of the received upstream signal 216 substantially matches the target power level. In some embodiments, the controller 212 may determine that the power level of the received upstream signal 216 exceeds a maximum power level (e.g., a maximum power level of the A/D converter 214), and may control the level scaler 208 to adjust the power level of the received upstream signal 216 to attenuate the power level of the received signal to prevent a signal having a power level that exceeds the maximum power level from being sent to the A/D converter 214. Thus, the head-end device 200 may adjust the power level of the upstream signal 216 to reduce degradation of the upstream signal that may be caused by the A/D converter 214.

In some embodiments, the head-end device 200 may perform a signal leveling function on the upstream signal 216. For example, the RF level detector 210 may sample (e.g., determine) a power level of the upstream signal over time (e.g., may determine a power level over time of one or more previously-received bursts of the upstream signal 216), and may provide the determined power level to the controller 212. In some embodiments, the controller 212 may use an aggregation method over time, such as moving window averaging or another analysis of the determined power level over time. The controller 212 may use the determined power level over time of the upstream signal 216 to control the level scaler 208 to adjust the power level of the received signal based on a determined difference between the target power level and the determined power level over time of the upstream signal 216. In some embodiments, the controller 212 may determine a modulation error ratio (MER) correlated with the determined power level over time (e.g., MER versus input levels). In some embodiments, the controller 212 may control the level scaler 208 to adjust the power level of the upstream signal 216 using a combination of power level attenuation and/or power leveling based on the determined power level over time of the upstream signal 216.

The level scaler 208 may provide the received signal with the adjusted power level to the A/D converter 214. The A/D converter 214 may convert the power level-adjusted signal from an analog signal to a digital signal, and the A/D converter 214 may send the digital signal to one or more elements of a communication network (e.g., the communication network 108).

In various embodiments, the head-end device 200 may function to rapidly suppress upstream signals with unexpectedly high signal power levels (for example, as may be caused by a relatively high power burst from client device 102, or from the communication link interference between the client device 102 and the head-end device 200, or from some other type of interference). Thus, in some embodiments, the relatively rapid response capability of the head-end device 200 may perform an "overload protection" function.

Figure 3:
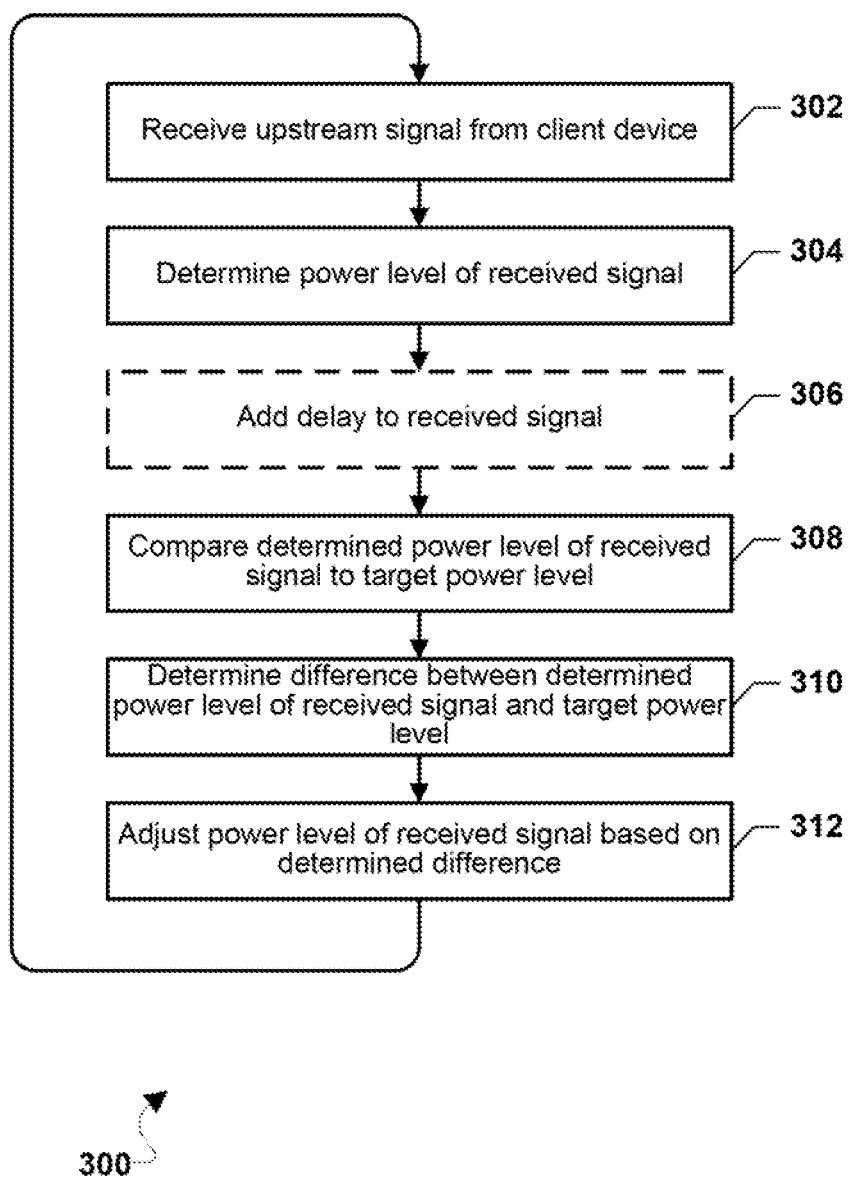
FIG. 3 is a process flow diagram illustrating a method for scaling a power level of an upstream signal according to various embodiments.

FIG. 3 is a process flow diagram illustrating a method 300 for scaling a power level of an upstream signal according to some embodiments. With reference to FIGS. 1-3, the method 300 may be implemented by a processor (e.g., the controller 212) of a head-end device (e.g., the head-end devices 106, 200).

In block 302, the head-end device may receive an upstream signal (e.g., the upstream signal 216) from a client device (e.g., the client device 102). In block 304, the head-end device may determine a power level of the received signal (e.g., by the RF level detector 210). In some embodiments, the head-end device may determine an instantaneous power level of the received signal, or the head-end device may determine a power level of the received signal over time, such as by as moving window averaging, or another analysis of the determined power level over time. In some embodiments, the head-end device may determine a power level over time of one or more previously-received bursts of the upstream signal. In some embodiments, the head-end device may determine a signal strength of one or more frequencies of the upstream signal. In some embodiments, the head-end device may determine a peak power, or an average power, per burst of the upstream signal. In various embodiments, the upstream signal may include one or more bursts that may be of variable duration and may occur (e.g., in an overlapping, non-synchronized manner) at different frequencies (e.g., channels), but each burst may have a stable power level over its duration.

In block 306, the head-end device may add a delay to the received signal (e.g., by the delay line 206 or another similar component). The head-end device may add the delay to the received signal to provide a period of time (e.g., a lookahead time or time period) in which to determine a power level of the received upstream signal 216 and/or to provide one or more instructions to a scaling device (e.g., the level scaler 208). The addition of delay to the receive signal (e.g., via hardware) may enable the head-end device to perform a power level adjustment to the entire upstream signal (e.g., to one or more bursts of the upstream signal). In some embodiments, without the added delay, the head-end device may be unable to perform a power level adjustment to a portion of the upstream signal (e.g., bits of the upstream signal/burst(s).

In block 308, the head-end device may compare the determined power level of the received signal to a target power level of the head-end device. In some embodiments, the target power level may include a target power level of an A/D converter of the head-end device. In some embodiments, the target power level may include a target power level range of the A/D converter.

In block 310, the head-end device may determine a difference between the determined power level of the received signal and the target power level. For example, the head-end device (e.g., the controller 202) may determine a difference between the power level of the received signal and a target power level (or target power level range) of the head-end device. In some embodiments, the head-end device may determine the difference between the power level of a burst of the received signal and the target power level of the analog-to-digital converter of the head-end device. In some embodiments, the head-end device may determine the difference between the power level of each of a plurality of bursts of the received signal and the target power level of the analog-to-digital converter on a burst-by-burst basis.

In block 312, the head-end device may adjust the power level of the received signal based on the determined difference between the determined power level of the received signal and the target power level. In some embodiments, the head-end device (e.g., the controller 212) may control the level scaler 208 to adjust the power level of the upstream signal 216 by attenuating or increasing the power level of the upstream signal 216 based on the determined power level over time of the upstream signal 216, or a combination thereof. In some embodiments, the head-end device may control the level scaler 208 to adjust the power level of the upstream signal based on a determined difference between the power level over time of one or more previously-received bursts of the upstream signal and the target power level. In some embodiments, the head-end device may adjust the power level of a burst of the received signal. In some embodiments, the head-end device may adjust the power level of each of a plurality of bursts of the received signal on a burst-by-burst basis based on the determined difference. In each case, the signal's burst level may be centered at the A/D input such that each signal arrives at the A/D at the optimum level.

The head-end device may return to block 302 and may receive another upstream signal from the client device.

In various embodiments, the head-end device may dynamically adjust the power level of an "unknown" upstream signal from the client device (such as a signal that the head-end device is previously unaware of, e.g., from signaling between the head-end device and the client device). Examples of an unknown signal include a non-DOCSIS signal such as a set-top return data carriers, and an interference signal. An unknown signal may also include DOCSIS signals received from the client device during initial ranging windows, in which the client device may progressively increase its transmit power until it is "heard" by the head-end device. The head-end device 200 may rapidly adjust (e.g., cut/attenuate or boost/increase) such upstream signals. Thus, the head-end device may prevent an A/D converter (e.g., the A/D converter 214) from clipping an upstream signal (e.g., the upstream signal 216) during analog-to-digital conversion. As another example, the head-end device may dynamically increase the signal power level of the upstream signal 216 when the signal power level is below the target power level, reducing signal degradation by the A/D converter due to poor MER performance (e.g., due to thermal noise or other interference) and/or quantization noise (due to insufficient resolution in the upstream signal). In various embodiments, the head-end device may receive an upstream signal from each of one or more client devices, and the head-end device may adjust each received upstream signal.

In some embodiments, adjusting the power level may include adjusting the power level of a burst of the received signal based on the determined difference between the power level of each burst and the target power level. For example, while each burst individually may have a relatively level power level, power level differences may occur from burst to burst, and such differences may be substantial. The head-end device may therefore dynamically adjust (e.g., attenuate or increase) the power level of each burst based on the target power level (or the determined difference between the power level of each burst and the target power level).

Figure 4:
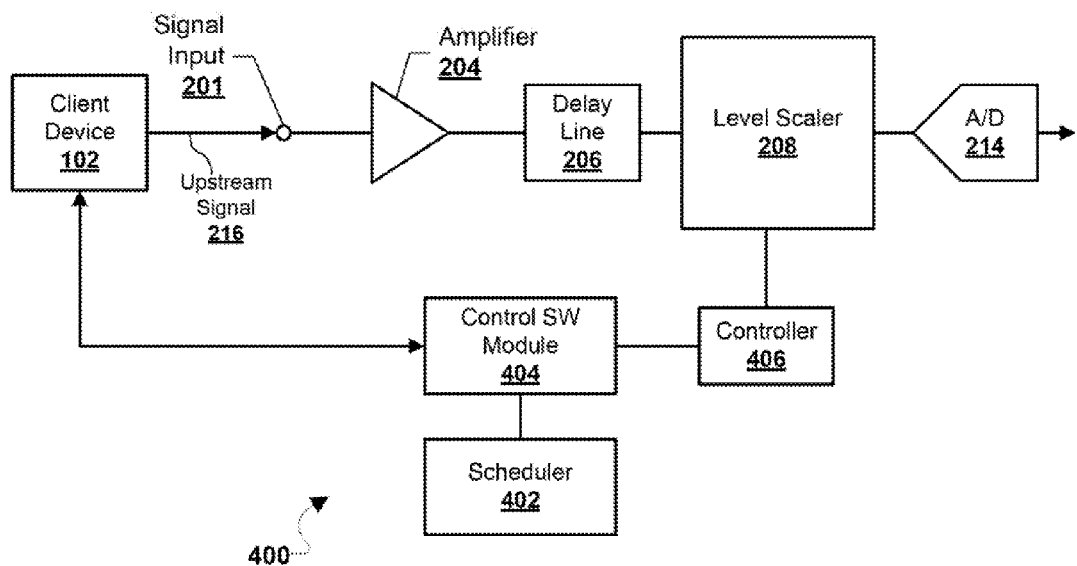
FIG. 4 is a block diagram illustrating a head-end device in a communication system according to various embodiments.

FIG. 4 is a block diagram illustrating a head-end device 400 in a communication system according to various embodiments. With reference to FIGS. 1-4, in various embodiments, the head-end device 400 may be similar to the head-end device 106. Components 204-214 may be similar to like-numbered blocks of the head-end device 200.

The head-end device 400 may include a scheduler 402, a control software (SW) module 404, and a controller 406 (which may include one or more processors). The scheduler 402 may include hardware and/or software modules of the head-end device 410 that may communicate with the client device 102. The scheduler 402 may periodically conduct or perform a ranging process with the client device 102.

In the ranging process, the scheduler 402 may receive two or more ranging requests from the client device 102 at a particular transmit power level. The scheduler 402 may respond with a ranging response which may include a timing offset, a power offset, and a temporary service identifier (SID). Based on the two or more ranging requests, the scheduler 402 may determine an expected signal power level of the one or more ranging requests. For example, the scheduler 402 may determine the expected signal power level based on whether one or more ranging requests were successful or failed, and whether a ranging request was repeated. The scheduler 402 may also send to the client device 102 a request to increase or decrease the transmit power level of the client device 102. In some embodiments, the request to increase or decrease the transmit power level of the client device 102 may be based on a target power level of the head-end device 400. The head-end device 400 and the client device 102 may iterate the ranging process until the head-end device 400 sends an acknowledgment of successful ranging to the client device 102, or until the client device 102 has sent a predetermined number of ranging requests.

The scheduler 402 may also receive a scheduling request or message from the client device 102 requesting an allocation of bandwidth from the scheduler 402 to transmit the upstream signal 216. The scheduler 402 may send to the client device 102 a scheduling message including a grant of bandwidth to transmit the upstream signal 216, a timing to transmit the upstream signal 216, and a duration (e.g., a number of symbols) during which the client device 102 may transmit the upstream signal 216.

In some embodiments, during the ranging process and/or based on the scheduling request from the client device 102, the scheduler 402 may receive information from the client device 102 indicating power transmit level capabilities of the client device 102. In some embodiments the scheduler 402 may determine the power transmit level capabilities of the client device 102 from historical information, such as from a prior initialization sequence of the head-end device. The scheduler 402 may provide such information to the control software module 404. In some embodiments, the control software module 404 may determine a power level of one or more signals received from the client device 102, such as a power level of one or more ranging requests from the client device 102, or a power level of one or more scheduling requests from the client device 102. The control software module 404 may include instructions configured to determine a power level of the upstream signal 216 based on, for example, the information and/or signal(s) received by the scheduler 402 from the client device 102. The software control module 404 may determine the power level of the upstream signal 216, and may provide the determined power level of the upstream signal 216 to the controller 406. In some embodiments, the software control module 404 may determine a power level of the upstream signal 216 before the head-end device 400 receives the upstream signal 216, for example, based on the information and/or signal(s) received by the scheduler 402 from the client device 102. In some embodiments, the software control module 404 may compare a maximum transmit power level capability of the client device 102 that the head-end device received during a prior initialization sequence (e.g., which the software control module 404 may have received in a report from the client device 102 indicating the maximum transmit power level capability of the client device 102) with the currently-reported transmit power level of the client device 102. The software control module 404 thus determine in advance a case in which the client device 102 cannot increase its transmit power to transmit a next burst. In other words, the software control module 404 may determine a future-looking (or expected) power level of the upstream signal 216 based on, for example, prior ranging messaging between the head-end device 400 and the client device 102.

The controller 406 may compare the determined power level of the upstream signal 216 and a target power level of the head-end device 400 (e.g., a target power level of the A/D converter 214). The controller 406 may determine a difference between the power level of the upstream signal 216 and the target power level. The controller 406 may control the level scaler 208 to adjust the power level of the received signal based on the determined difference between the power level of the upstream signal 216 and the target power level. The controller 406 may control the level scaler 208 to adjust the received signal power level higher or lower based on the target power level. The controller 406 may control the level scaler 208 to adjust the power level of the received signal based on the determined difference such that the power level of the received upstream signal 216 substantially matches the target power level. In some embodiments, the controller 406 may determine that the power level of the received upstream signal 216 is below a minimum power level (e.g., a minimum power level of the A/D converter 214), and may control the level scaler 208 to adjust the power level of the received upstream signal 216 to attenuate the power level of the received signal to prevent a signal having a power level that is below the minimum power level from being sent to the A/D converter 214. In such cases, the availability of reliable future-looking information as to the expected power level of a burst may effectively eliminate a need for any time delay, thus avoiding any degradation of latency performance of the head-end device 400.

Thus, the head-end device 400 may adjust the signal power level of the upstream signal 216 to reduce degradation of the upstream signal that may be caused by the A/D 214 converting an upstream signal 216 having a power level that is lower than the target power level. For example, attenuating the signal power level of the upstream signal 216 when the signal power level is above the target power level may prevent the A/D converter 214 from clipping the upstream signal 216 during analog-to-digital conversion. As another example, increasing the signal power level of the upstream signal 216 when the signal power level is below the target power level may prevent signal degradation by the A/D converter 214 due to poor MER performance (e.g., due to thermal noise or other interference) and/or quantization noise (e.g., due to insufficient A/D converter resolution available to encode an upstream signal with a signal power level below the target power level).

In some embodiments, the head-end device 400 may also obtain historical information about the power level capabilities of the client device 102. For example, based on the ranging process and/or one or more requests for bandwidth to transmit the upstream signal 216, the control software module 404 and/or the controller 406 may determine and store information about the power level capabilities of the client device 102 and/or information about the power levels of signals received by the head-end device 400 from the client device 102. In some embodiments, the controller 406 may use the historical information about the client device 102 to control the level scaler 208 to adjust the received signal power level of the upstream signal 216.

Figure 5:
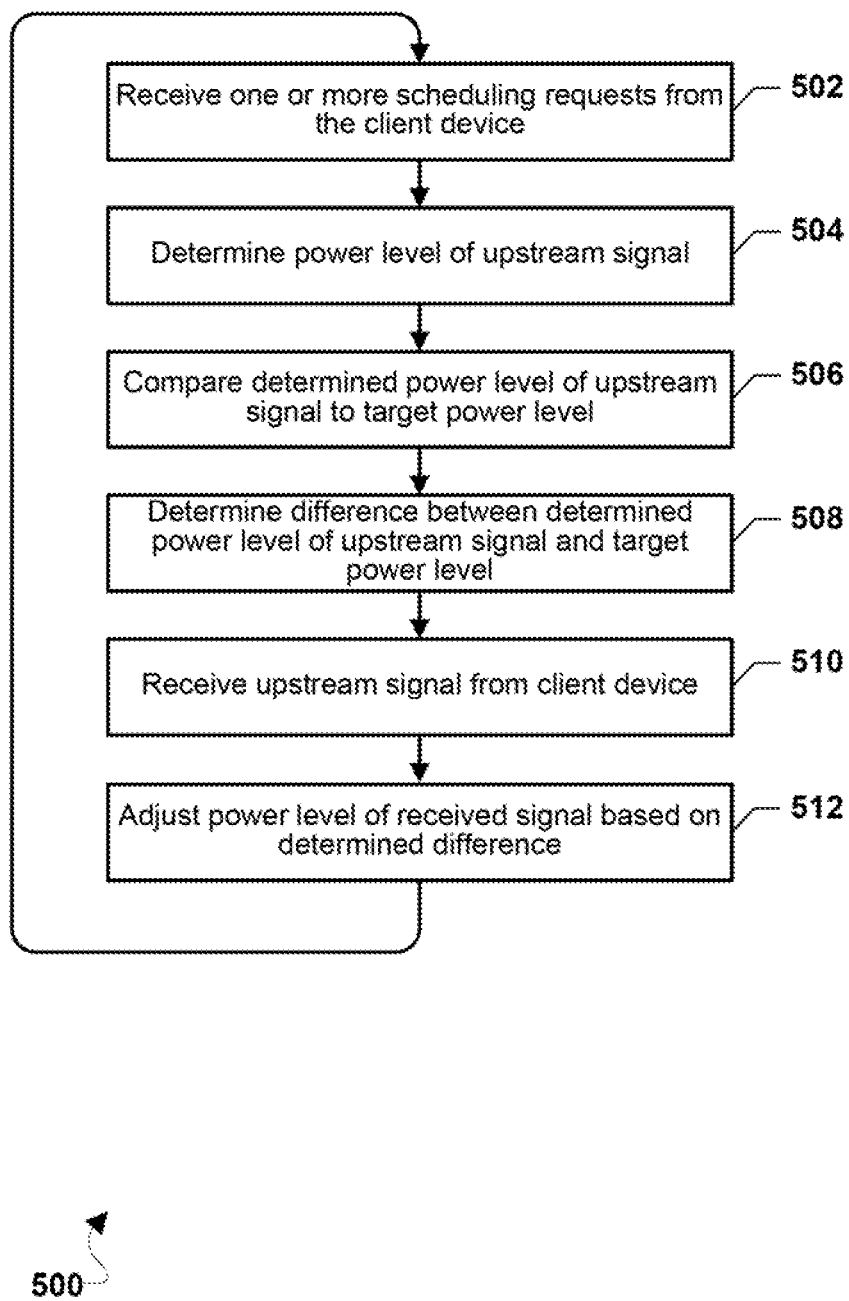
FIG. 5 is a process flow diagram illustrating a method for scaling a power level of an upstream signal according to various embodiments.

In various embodiments, the head-end device 400 may function to dynamically increase the power level of the upstream signal 216 (for example, an upstream signal 216 transmitted from client device 102 at a relatively low signal power level. Thus, in some embodiments, the head-end device 400 may perform precise scaling and individual carrier level control of upstream signals from multiple client devices transmitting to the head-end device 400. Further, the head-end device 400 may adjust the power level of a signal received from a client device that is unable to increase its transmit power level to meet the target power level of the head-end device 400. FIG. 5 is a process flow diagram illustrating a method 500 for scaling a power level of an upstream signal according to some embodiments. With reference to FIGS. 1-5, the method 500 may be implemented by a processor (e.g., the controller 406) of a head-end device (e.g., the head-end devices 106, 400).

In block 502, the device processor may receive one or more scheduling requests from a client device 102. A scheduling request may include a request for bandwidth to transmit the upstream signal to the head-end device. In some embodiments, a scheduling request may include a report (which may be a separate message) of a maximum transmit power capability of the client device 102.

In block 504, the device processor may determine a power level of an upstream signal from the client device 102 (e.g., the upstream signal 216). In some embodiments, the device processor may determine the power level of the upstream signal based on, for example, information and/or signal(s) received by the device processor from the client device 102 during a ranging process and/or in one or more scheduling requests from the client device 102. That is, in some embodiments the device processor may determine the power level of the upstream signal before the head-end device receives the upstream signal from the client device 102. In block 506, the device processor may compare the determined power level of the upstream signal to a target power level of the head-end device (e.g., a target power level and/or target power level range of the A/D converter 214). In block 508, the device processor may determine a difference between the determined power level of the upstream signal and the target power level.

In block 510, the device processor may receive the upstream signal from a client device. In block 512, the device processor may adjust the power level of the received signal based on the determined difference between the determined power level of the received signal to the target power level. In some embodiments, the device processor may also use historical information about transmit power capabilities of the client device and/or historical upstream signal power levels to adjust the power level of the received signal. In some embodiments, the device processor may perform level scaling adjustments (e.g., power level adjustments) with very low latency, at least in part due to the determination of the power level of the upstream signal before the device processor receives the upstream signal from the client device.

In some embodiments, adjusting the power level may include adjusting the power level of a burst of the received signal based on the determined difference between the power level of each burst and the target power level. For example, while each burst individually may have a relatively level power level, power level differences may occur from burst to burst, and such differences may be substantial. The head-end device may therefore dynamically adjust (e.g., attenuate or increase) the power level of each burst based on the target power level (or the determined difference between the power level of each burst and the target power level).

In various embodiments, the device processor may receive an upstream signal (e.g., the upstream signal 216) from each of one or more client devices, and the head-end device 200 may adjust each received upstream signal. In some embodiments, the device processor may dynamically adjust (e.g., attenuate or increase) the power level of each burst from each of the one or more client devices based on the target power level (or the determined difference between the power level of each burst and the target power level). The device processor may return to block 502 and may receive one or more scheduling requests from the client device.

Figure 6:
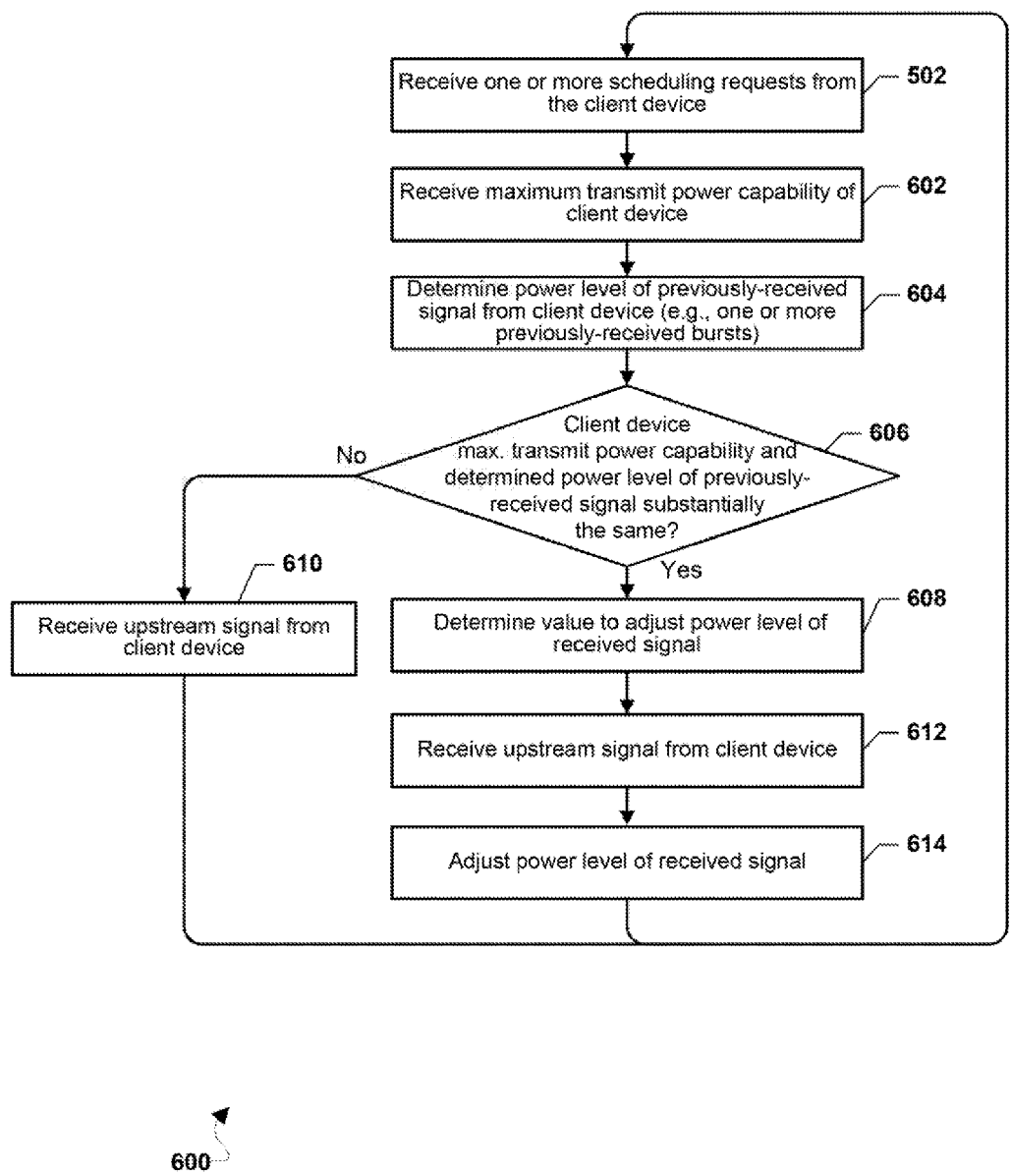
FIG. 6 is a process flow diagram illustrating a method for scaling a power level of an upstream signal according to various embodiments.

FIG. 6 is a process flow diagram illustrating a method 600 for scaling a power level of an upstream signal according to some embodiments. With reference to FIGS. 1-6, the method 600 may be implemented by a processor (e.g., the controller 402) of a head-end device (e.g., the head-end devices 106, 400). Block 502 may be similar to the like-numbered block of the method 500.

In block 602, the device processor may receive a maximum transmit power capability of the client device (e.g., the client device 102). In some embodiments, the device processor may receive from the client device metadata that includes the maximum transmit power capability of the client device. In block 604, the device processor may determine a power level of a previously-received signal from the client device 102 (for example, one or more previously-received bursts). In some embodiments, the device processor may determine the power level of the upstream signal (e.g., the upstream signal 216) based on a comparison of the maximum transmit power capability reported to the device processor by the client device 102 and the power level of a previously-received upstream signal (e.g., one or more prior bursts) from the client device 102.

In determination block 606, the device processor may determine whether the maximum transmit power capability of the client device and the power level of the previously-received signal from the client device are substantially the same. In response to determining that the maximum transmit power capability of the client device and the power level of the previously-received signal from the client device are not substantially the same (i.e., determination block 606="No"), the device processor may receive the upstream signal from the client device in block 610. The device processor may then receive one or more scheduling requests from the client device in block 502 without adjusting power level of the received upstream signal.

In response to determining that the maximum transmit power capability of the client device and the power level of the previously-received signal from the client device are substantially the same (i.e., determination block 606="Yes"), the device processor may determine a value to adjust the power level of the received signal in block 608. For example, the device processor may determine a value of a level scaler of the head-end device (e.g., the level scaler 208). The device processor may determine the value to adjust the power level of the received signal based on the determined power level of the expected signal (e.g., the expected upstream signal) and the target power level of the head-end device.

In block 612, the device processor may receive the upstream signal from the client device. In block 614, the device processor may adjust the power level of the received signal by applying the determined value of the level scaler to the upstream signal.

For example, the device processor may determine the power level of the upstream signal 216 based on a comparison of a maximum transmit power capability reported to the device processor by the client device 102 and a power level of a previously-received upstream signal (e.g., one or more prior bursts) from the client device 102. In some cases, the device processor may determine that the reported maximum transmit power and the previously received upstream signal of the client device 102 are substantially the same. In such cases, the device processor may determine that the client device 102 is transmitting at its maximum transmit power level. Further, the device processor may determine that a previously-received burst from the client device 102 is below the target power level. In such embodiments, the device processor may use such information to adjust the level scaler such that an anticipated burst (e.g., a burst expected to arrive from the client device 102) is scaled to meet the target power level of the A/D converter. Thus, in such embodiments, the device processor may use forward-looking information about the signal power level of the upstream signal 216 to adjust the level scaler of the head-end device "just in time" (e.g., just prior to the arrival of the anticipated burst) to adjust the power level of the upstream signal 216. In some embodiments, the device processor may adjust the value of the level scaler to a previous value after adjusting the power level of the upstream signal (e.g., following the end of the burst grant period).

Figure 7:
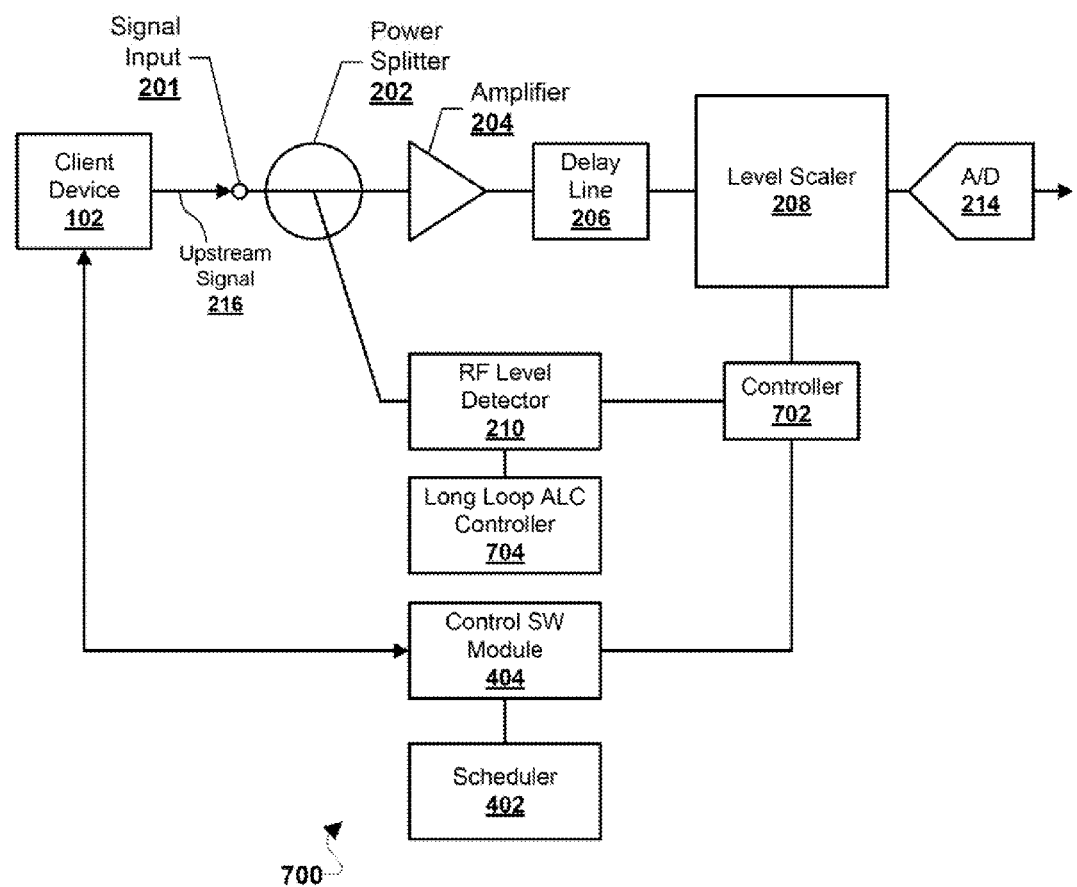
FIG. 7 is a block diagram illustrating a head-end device in a communication system according to various embodiments.

FIG. 7 is a block diagram illustrating a head-end device 700 in a communication system according to various embodiments. With reference to FIGS. 1-7, in various embodiments, the head-end device 700 may be similar to the head-end device 106. Components 204-214, 402, and 404 may be similar to like-numbered blocks of the head-end devices 200 and 400.

The head-end device 700 may include a controller 702 which may communicate with the RF level detector 210, control software module 404, and the level scaler 208. The head-end device 700 may perform a combination of one or more functions of the head-end device 200 and the head-end device 400. For example, the RF level detector 210 may determine a power level of the received upstream signal 216, and may provide the detected power level of the upstream signal the controller 702. The controller 702 may compare the detected power level of the upstream signal to a target power level of the head-end device 700 (e.g., a target power level of the A/D converter 214) based on the determined power level of the upstream signal 216, the controller 212 may provide one or more instructions to the level scaler 208 to adjust the power level of the upstream signal 216.

The controller 702 may also receive the determined power level of an upstream signal that has not been received yet by the head-end device 700. For example, the control software module 404 may determine a power level of one or more signals received from the client device 102, such as a power level of one or more ranging requests from the client device 102, or a power level of one or more scheduling requests from the client device 102. The software control module 404 may determine the power level of the upstream signal 216, and may provide the determined power level of the upstream signal 216 to the controller 702. The controller 702 may compare the determined power level of the upstream signal 216 and a target power level of the head-end device 700 (e.g., a target power level of the A/D converter 214). The controller 702 may determine a difference between the power level of the upstream signal 216 and the target power level, and the controller 702 may control the level scaler 208 to adjust the power level of the received signal based on the determined difference between the power level of the upstream signal 216 and the target power level.

In various embodiments, a head-end device 700 that incorporates aspects of the head-end device 200 and the head-end device 400 may rapidly adjust the power level of upstream signals (e.g., may utilize hardware aspects of the head-end device 200 to perform an "overload protection" function), and may also perform precise scaling and individual carrier level control in a multi-client device transmit environment using elements of the head-end device 400.

In some embodiments, the head-end device 700 may receive signals using separate frequencies (e.g., channels or carriers) from a plurality of client devices during the same time interval. Such signals, which may be identified with the respective transmitting client device, may be received by the head-end device 700 at different power levels. In such embodiments, the signal frequencies may be at fixed and known locations, and the head-end device 700 may separate the signals (e.g., using one or more filtering techniques) and further may dynamically adjust the signal power level of each signal from the plurality of client devices.

The head-end device 700 may also include a long loop ALC controller 704, which may communicate with the RF level detector 210. In some embodiments, the head-end device 700 may perform long loop ALC of the transmit power level of each client device. In effect, the head-end device 700 may perform a remote adjustment of each client device's transmit power. In some cases, performing the power level adjustment of the upstream signal by the head-end 700 may adversely interact with the with the long loop ALC function. In order to prevent this adverse interaction, in some embodiments, the long loop ALC controller 704 may sample a burst power level of the upstream signal prior to sending the upstream signal to the level scaler 208. In some embodiments, the long loop ALC controller 704 may be configured to mitigate adverse interactions between the long loop ALC function and the power level adjustment of the upstream signal by the head-end 700. For example, the long loop ALC function may include the head-end device 704 sending a power level command to the client device based on the detected power level of an upstream signal. In some embodiments, the long loop ALC controller 704 may determine not to send (e.g., may determine that it is best not to send) a command (or may block the sending of a command) to the client device to take an action (e.g. to disable or limit an ALC action) or to command the client device to take a greater action.

Figure 8:
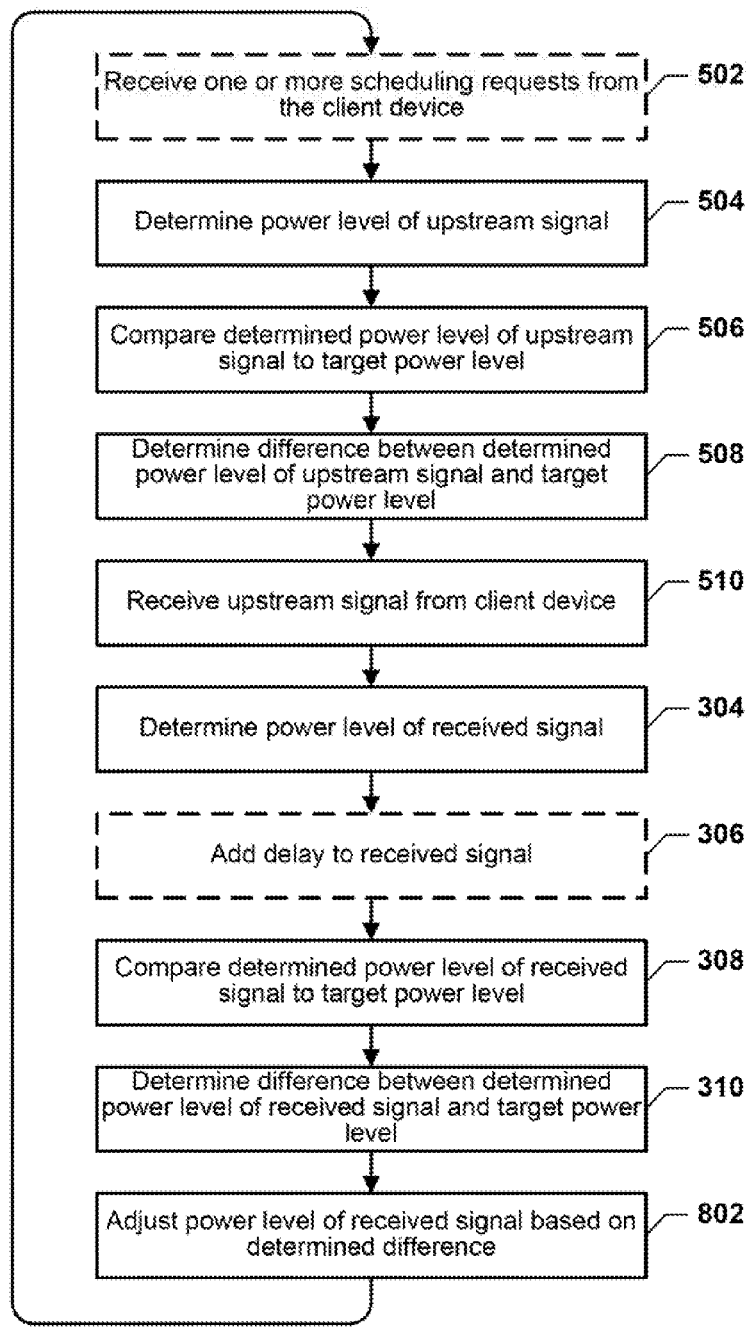
FIG. 8 is a process flow diagram illustrating a method for scaling a power level of an upstream signal according to various embodiments.

FIG. 8 is a process flow diagram illustrating a method 800 for scaling a power level of an upstream signal according to some embodiments. With reference to FIGS. 1-7, the method 700 may be implemented by a processor (e.g., the controller 702) of a head-end device (e.g., the head-end devices 106, 700). Blocks 304-310 and 502-510 may be similar to like-numbered blocks of the methods 300 and 500.

In optional block 502, a processor of the head-end device (e.g., a device processor) may periodically perform a ranging process with the client device 102. In block 504, the device processor may receive one or more scheduling requests from the client device 102. In block 506, the device processor may determine an expected power level of an upstream signal from the client device 102 (e.g., the upstream signal 216). In some embodiments, the device processor may determine the power level of the upstream signal based on, for example, information and/or signal(s) received by the device processor from the client device 102 during a ranging process and/or in one or more requests for bandwidth to transmit the upstream signal. That is, in some embodiments the device processor may determine the power level of the upstream signal before the head-end device receives the upstream signal from the client device 102. In block 508, the device processor may compare the determined power level of the upstream signal to a target power level of the head-end device (e.g., a target power level and/or target power level range of the A/D converter 214). In block 508, the device processor may determine a difference between the determined power level of the upstream signal and the target power level. In block 510, the device processor may receive the upstream signal from a client device.

In block 304, the head-end device may determine a power level of the received signal. In block 306, the head-end device may add a delay to the received signal (e.g., by the delay line component 206). In block 308, the head-end device may compare the determined power level of the received signal to a target power level of the head-end device (e.g., a target power level/range of the A/D converter 214). In block 310, the head-end device may determine a difference between the determined power level of the received signal and the target power level. For example, the head-end device (e.g., the controller 702) may determine a difference between the power level of the received signal and a target power level (or target power level range) of the head-end device.

In block 802, the device processor may adjust the power level of the received signal based on the determined difference between the determined power level of the upstream signal and the target power level and/or the determined difference between the determined power level of the received signal and the target power level. Thus, the device processor may function to rapidly suppress upstream signals with unexpectedly high signal power levels (for example, as may be caused by a relatively high power burst from client device 102, or from the communication link interference between the client device 102 and the head-end device, or from some other type of interference), as well as to dynamically increase the power level of the upstream signal 216 (for example, an upstream signal 216 transmitted from client device 102 at a relatively low signal power level, or an upstream signal 216 having a signal power level that is attenuated by communication link interference between the client device 102 and the head-end device 200).

In some embodiments, the device processor may also use historical information about transmit power capabilities of the client device and/or historical upstream signal power levels to adjust the power level of the received signal. The device processor may return to block 504 and determine a power level of another upstream signal. In some embodiments, the device processor may return to optional block 502 and perform the ranging process with the client device.

In various embodiments, the head-end device 700 may control (e.g., schedule) choices of which of a plurality of client devices may transmit during multiple simultaneous client device transmission events (which may depend in some cases on the client device's capability to transmit an upstream signal to as to attain the target power level at the head-end device). For example, the head-end device 600 may schedule two or more client devices that are having difficulty attaining the desired target power level at the head-end device to transmit together. The composite power of the signal from the two or more client devices may be more tightly controlled by the head-end device, and thus the head-end device may more effectively and efficiently scale the power level of the upstream signal, as transmitting the upstream signal from each client device together may serve to minimize power level differences between carriers used by each client device.

In various embodiments, in a system in which a plurality of client devices are scheduled to transmit substantially simultaneously on different carriers, the head-end device 700 may send a command or instruction to an individual client device to adjust the client device's transmit power. In some embodiments, the head-end device may send such command(s) based on historical information associated with a client device. For example, when one or more first client devices known to send upstream signals that arrive with a power level below the target power level are scheduled to transmit at the same time as one or more second client devices known to send upstream signals that meet the target power level, the head-end device may send an instruction to one or more of the second client devices to reduce the transmit power level of the second client device(s), so that the second client device(s) reduce their transmit power levels to be closer to the transmit power level of the first modem(s). The head-end device 700 may thus control the resulting composite upstream signal power to reduce power level differences among carriers, and the head-end device may more effectively scale the power level of the composite upstream signal.

Thus, the head-end device 700 may dynamically scale a power level of an upstream signal based on a target signal power level (or range) of the head-end device. Dynamically scaling the power level of the upstream signal may include increasing or decreasing the signal power level for the received upstream signal to decrease a difference between the upstream signal received power level and the target signal power level/range. The head-end device may thereby improve communications between a client device and the head-end device over a communications network so as to use existing communication link resources more effectively and efficiently. Dynamically scaling the power level of the upstream signal may improve the available dynamic range of the upstream signal, allowing a higher modulation scheme to be used in communication between the client device and the head-end device, as well as greater communication efficiency (e.g., in bits/cycle).

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 300, 500, 600, and 800 may be substituted for or combined with one or more operations of the methods 300, 500, 600 and 800, and vice versa.

Figure 9:
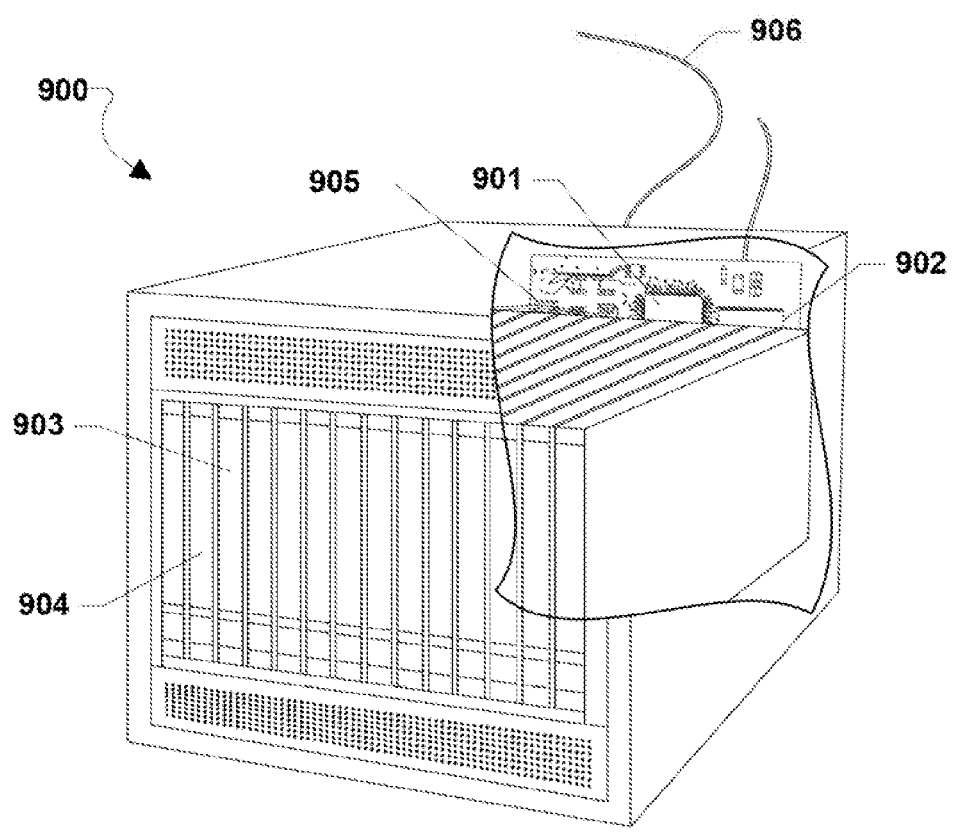
FIG. 9 is a component diagram of an example head-end device suitable for use with the various aspects.

Various aspects may be implemented on any of a variety of commercially available head-end devices, such as the head-end device 900 illustrated in FIG. 9. Such a head-end device 900 may include a processor 901 coupled to volatile memory 902 and a large capacity nonvolatile memory, such as a disk drive 903. The head-end device 900 may also include a floppy disc drive, compact disc (CD) or DVD disc drive 904 coupled to the processor 901. The head-end device 900 may also include network access ports 906 coupled to the processor 901 for establishing data connections with a network connection circuit 905 and a communication network coupled to other communication system network elements.

The processor 901 may be any programmable microprocessor, microcomputer or multiple processor chip or chips that can be configured by software instructions (applications) to perform a variety of functions, including the functions of the various aspects described below. In some head-end devices 900, multiple processors 901 may be provided, such as one or more processors dedicated to communication functions and one or more processors dedicated to performing other functions or running other applications. Software applications may be stored in the nonvolatile memory 903 before they are accessed and loaded into the processor 901. The processor 901 may include internal memory sufficient to store the application software instructions.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process may be stored in memory so the process may seamlessly resume its operations when it returns to execution on the processor. This operational state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavyweight process that includes multiple lightweight processes or threads, which are processes that share all or portions of their context (e.g., address space, stack, permissions, and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the embodiments. Thus, various embodiments are not intended to be limited to the embodiments shown herein but are to be accorded the widest scope consistent with the following claims and the principles and novel features disclosed herein.

What is claimed is:

1. A method of scaling a power level of an upstream signal, comprising:
   determining a power level of a signal comprising a plurality of bursts received at a head-end device from a client device;
   determining a difference between the power level of each of the plurality of bursts of the received signal and a target power level of an analog-to-digital converter of the head-end device on a burst-by-burst basis; and
   adjusting the power level of the received signal at the head-end device based on the determined difference.

2. The method of claim 1, further comprising providing the received signal with the adjusted power level to the analog-to-digital converter of the head-end device.

3. The method of claim 1, wherein adjusting the power level of the received signal at the head-end device based on the determined difference comprises adjusting the power level of a burst of the received signal at the head-end device based on the determined difference.

4. The method of claim 3, wherein adjusting the power level of a burst of the received signal at the head-end device based on the determined difference comprises adjusting the power level of each of a plurality of bursts of the receive signal on a burst-by-burst basis based on the determined difference.

5. The method of claim 1, wherein determining the difference between the power level of the received signal and the target power level comprises comparing the determined power level of the received signal to the target power level of the analog-to-digital converter.

6. The method of claim 5, wherein comparing the determined power level of the received signal and the target power level of the analog-to-digital converter comprises comparing the determined power level of each of a plurality of bursts of the received signal on a burst-by-burst basis to the target power level of the analog-to-digital converter.

7. The method of claim 1, wherein determining the power level of the signal received at the head-end device from the client device comprises:
  determining a power level over time of one or more previously-received bursts of the received signal; and
  wherein determining a difference between the power level of the received signal and a target power level comprises:
  determining a difference between the power level over time of the received signal and the target power level.

8. The method of claim 7, wherein adjusting the power level of the receive signal at the head-end device based on the determined difference comprises:
  adjusting the power level of the receive signal at the head-end device based on the determined difference between the power level over time of one or more previously-received bursts of the received signal and the target power level.

9. A method of scaling a power level of an upstream signal, comprising:
  determining a power level of each of a plurality of signals received at a head-end device from a client device, wherein each of the plurality of signals is received from one of a plurality of client devices;
  determining a difference between the power level of each received signal and a target power level; and
  adjusting the power level of each received signal individually at the head-end device based on the determined difference of each signal.

10. A method of scaling a power level of an upstream signal, comprising:
  determining, at a head-end device, a power level of an upstream signal to be sent from a client device to the head-end device;
  determining, at the head-end device, a difference between the power level of the upstream signal and a target power level of an analog-to-digital converter of the head-end device;
  receiving the upstream signal from the client device at the head-end device; and
  adjusting a power level of the received signal at the head-end device based on the determined difference between the power level of the upstream signal and the target power level.

11. The method of claim 10, further comprising:
  receiving one or more scheduling requests from the client device at the head-end device;
  wherein determining a power level of an upstream signal to be sent from the client device to the head-end device comprises:
  determining the power level of the upstream signal to be sent from the client device to the head-end device based on the one or more scheduling requests.

12. The method of claim 10, wherein determining the difference between the power level of the upstream signal and the target power level of the analog-to-digital converter comprises comparing the determined power level of the upstream signal to the target power level of the analog-to-digital converter.

13. The method of claim 10, further comprising:
  determining a power level of a signal received at the head-end device from the client device; and
  determining a difference between the power level of the received signal and the target power level of the analog-to-digital converter; wherein
  adjusting the power level of the received signal at the head-end device based on the determined difference between the power level of the upstream signal and the target power level comprises adjusting the power level of the received signal at the head-end device based on one or more of the determined difference the between the power level of the upstream signal and the target power level, and the determined difference between the power level of the received signal and the target power level.

14. The method of claim 10, wherein:
  determining the power level of the upstream signal to be sent from a client device to a head-end device comprises determining a power level of a plurality of upstream signals, wherein each upstream signal is to be sent from one of a plurality of client devices;
  determining the difference between the power level of the upstream signal and the target power level of the analog-to-digital converter of the head-end device comprises determining a difference between the power level of each received signal and the target power level of the analog-to-digital converter; and
  adjusting the power level of the received signal at the head-end device based on the determined difference between the power level of the upstream signal and the target power level comprises adjusting the power level of each received signal individually at the head-end device based on the determined difference of each signal.

15. The method of claim 10, wherein determining a power level of an upstream signal to be sent from a client device to a head-end device comprises:
  receiving a maximum transmit power capability of the client device; and
  determining a power level of one or more previously-received upstream signals;
  wherein determining a difference between the power level of the upstream signal and a target power level of an analog-to-digital converter of the head-end device comprises:
  determining whether the maximum transmit power capability of the client device and the power level of the one or more previously-received upstream signals are substantially the same;
  determining a value to adjust the power level of the received upstream signal in response to determining that the maximum transmit power capability of the client device and the power level of the one or more previously-received upstream signals are substantially the same; and
  wherein adjusting a power level of the received signal at the head-end device based on the determined difference between the power level of the upstream signal and the target power level comprises adjusting the power level of the received signal using the determined value.

16. A method of scaling a power level of an upstream signal, comprising:
  determining, at a head-end device, a power level of an upstream signal to be sent from a client device to the head-end device;
  determining, at the head-end device, a difference between the power level of the upstream signal and a target power level of an analog-to-digital converter of the head-end device;
  receiving the upstream signal from the client device at the head-end device;
  determining a power level of the received signal;

determining a difference between the power level of the received signal and the target power level of the analog-to-digital converter of the head-end device; and adjusting the power level of the received signal at the head-end device based on one or more of the determined difference between the power level of the upstream signal and the target power level, and the determined difference between the determined power level of the received signal and the target power level.

17. A head-end device, comprising:
a signal input;
an analog-to-digital converter;
a level scaler; and
a controller coupled to the signal input, the analog-to-digital converter, and the level scaler, and configured with processor-executable instructions to perform operations comprising:
determining a power level of a signal received at the signal input from a client device;
determining a difference between the power level of the received signal and a target power level of the analog-to-digital converter by comparing the determined power level of each of a plurality of bursts of the received signal on a burst-by-burst basis to the target power level of the analog-to-digital converter; and
adjusting the power level of the received signal at the level scaler based on the determined difference.

18. The head-end device of claim 17, wherein the controller is configured with processor-executable instructions to perform operations further comprising providing the received signal with the adjusted power level to the analog-to-digital converter.

19. The head-end device of claim 17, wherein the controller is configured with processor-executable instructions to perform operations such that determining the difference between the power level of the received signal and the target power level of the analog-to-digital converter of the head-end device comprises determining the difference between the power level of a burst of the received signal and the target power level of the analog-to-digital converter of the head-end device.

20. The head-end device of claim 17, wherein the controller is configured with processor-executable instructions to perform operations such that determining the difference between the power level of a burst of the received signal and the target power level of the analog-to-digital converter of the head-end device comprises determining the difference between the power level of each of a plurality of bursts of the received signal and the target power level of the analog-to-digital converter of the head-end device on a burst-by-burst basis.

21. The head-end device of claim 19, wherein the controller is configured with processor-executable instructions to perform operations such that adjusting the power level of the received signal at the head-end device based on the determined difference comprises adjusting the power level of a burst of the received signal at the head-end device based on the determined difference.

22. The head-end device of claim 21, wherein the controller is configured with processor-executable instructions to perform operations such that adjusting the power level of a burst of the received signal at the head-end device based on the determined difference comprises adjusting the power level of each of a plurality of bursts of the receive signal on a burst-by-burst basis based on the determined difference.

23. The head-end device of claim 17, wherein the controller is configured with processor-executable instructions to perform operations such that determining the power level of the signal received at the head-end device from the client device comprises:
determining a power level over time of one or more previously-received bursts of the received signal; and
determining a difference between the power level of the received signal and a target power level comprises:
determining a difference between the power level over time of the received signal and the target power level.

24. The head-end device of claim 23, wherein the controller is configured with processor-executable instructions to perform operations such that adjusting the power level of the receive signal at the head-end device based on the determined difference comprises:
adjusting the power level of the receive signal at the head-end device based on the determined difference between the power level over time of one or more previously-received bursts of the received signal and the target power level.

25. The head-end device of claim 17, further comprising:
a scheduler coupled to the controller;
wherein the controller is configured with processor-executable instructions to perform operations further comprising:
determining a power level of an upstream signal to be sent from the client device to a head-end device; and
determining a difference between the power level of the upstream signal and the target power level of an analog-to-digital converter of the head-end device;
wherein adjusting the power level of the received signal at the level scaler based on the determined difference comprises adjusting the power level of the received signal at the level scaler based on one or more of the determined difference between the power level of the upstream signal and the target power level, and the determined difference between the power level of the received signal and the target power level.

26. The head-end device of claim 25, wherein the controller is configured with processor-executable instructions to perform operations further comprising:
receiving one or more scheduling requests from the client device at the head-end device;
wherein determining a power level of an upstream signal to be sent from the client device to the head-end device comprises:
determining the power level of the upstream signal to be sent from the client device to the head-end device based on the one or more scheduling requests.

27. The head-end device of claim 26, wherein the controller is configured with processor-executable instructions to perform operations such that determining the difference between the power level of the upstream signal and the target power level of the analog-to-digital converter comprises comparing the determined power level of the upstream signal to the target power level of the analog-to-digital converter.

28. The head-end device of claim 25, wherein:
determining the power level of the upstream signal to be sent from a client device to a head-end device comprises determining a power level of a plurality of upstream signals, wherein each upstream signal is to be sent from one of a plurality of client devices;
determining the difference between the power level of the upstream signal and the target power level of the analog-to-digital converter of the head-end device comprises determining a difference between the power level of each received signal and the target power level of the analog-to-digital converter; and adjusting the power level of the received signal at the head-end device based on the determined difference between the power level of the upstream signal and the target power level comprises adjusting the power level of each received signal individually at the head-end device based on the determined difference of each signal.

29. The head-end device of claim 25, wherein determining a power level of an upstream signal to be sent from a client device to a head-end device comprises:

receiving a maximum transmit power capability of the client device; and determining a power level of one or more previously-received upstream signals;

wherein determining a difference between the power level of the upstream signal and a target power level of an analog-to-digital converter of the head-end device comprises:

determining whether the maximum transmit power capability of the client device and the power level of the one or more previously-received upstream signals are substantially the same;

determining a value to adjust the power level of the received upstream signal in response to determining that the maximum transmit power capability of the client device and the power level of the one or more previously-received upstream signals are substantially the same; and wherein adjusting a power level of the received signal at the head-end device based on the determined difference between the power level of the upstream signal and the target power level comprises adjusting the power level of the received signal using the determined value.

30. A head-end device, comprising:

a signal input;

an analog-to-digital converter;

a level scaler; and a controller coupled to the signal input, the analog-to-digital converter, and the level scaler, and configured with processor-executable instructions to perform operations comprising:

determining a power level of each of a plurality of signals received at a head-end device from a client device, wherein each of the plurality of signals is received from one of a plurality of client devices;

determining a difference between the power level of each received signal and a target power level; and adjusting the power level of each received signal individually at the head-end device based on the determined difference of each signal.

31. A non-transitory processor-readable storage medium having stored thereon processor-executable software instructions configured to cause a controller to perform operations comprising:

determining, at a head-end device, a power level of an upstream signal to be sent from a client device to the head-end device;

determining, at the head-end device, a difference between the power level of the upstream signal and a target power level of an analog-to-digital converter of the head-end device;

receiving the upstream signal from the client device at the head-end device; and adjusting a power level of the received signal at the head-end device based on the determined difference between the power level of the upstream signal and the target power level.

32. The non-transitory processor-readable storage medium of claim 31, wherein the stored processor-executable software instructions are configured to cause a controller to perform operations further comprising:

receiving one or more scheduling requests from the client device at the head-end device;

wherein determining a power level of an upstream signal to be sent from the client device to the head-end device comprises:

determining the power level of the upstream signal to be sent from the client device to the head-end device based on the one or more scheduling requests.

33. The non-transitory processor-readable storage medium of claim 31, wherein the stored processor-executable software instructions are configured to cause a controller to perform operations further comprising:

determining a power level of a signal received at the head-end device from the client device; and determining a difference between the power level of the received signal and the target power level of the analog-to-digital converter; wherein adjusting the power level of the received signal at the head-end device based on the determined difference between the power level of the upstream signal and the target power level comprises adjusting the power level of the received signal at the head-end device based on one or more of the determined difference the between the power level of the upstream signal and the target power level, and the determined difference between the power level of the received signal and the target power level.

34. The non-transitory processor-readable storage medium of claim 31, wherein the stored processor-executable software instructions are configured to cause a controller to perform operations such that:

determining the power level of the upstream signal to be sent from a client device to a head-end device comprises determining a power level of a plurality of upstream signals, wherein each upstream signal is to be sent from one of a plurality of client devices;

determining the difference between the power level of the upstream signal and the target power level of the analog-to-digital converter of the head-end device comprises determining a difference between the power level of each received signal and the target power level of the analog-to-digital converter; and adjusting the power level of the received signal at the head-end device based on the determined difference between the power level of the upstream signal and the target power level comprises adjusting the power level of each received signal individually at the head-end device based on the determined difference of each signal.

35. The non-transitory processor-readable storage medium of claim 31, wherein the stored processor-executable software instructions are configured to cause a controller to perform operations such that determining a power level of an upstream signal to be sent from a client device to a head-end device comprises:

receiving a maximum transmit power capability of the client device; and determining a power level of one or more previously-received upstream signals;

wherein determining a difference between the power level of the upstream signal and a target power level of an analog-to-digital converter of the head-end device comprises:
- determining whether the maximum transmit power capability of the client device and the power level of the one or more previously-received upstream signals are substantially the same;
- determining a value to adjust the power level of the received upstream signal in response to determining that the maximum transmit power capability of the client device and the power level of the one or more previously-received upstream signals are substantially the same; and wherein adjusting a power level of the received signal at the head-end device based on the determined difference between the power level of the upstream signal and the target power level comprises adjusting the power level of the received signal using the determined value.

36. A non-transitory processor-readable storage medium having stored thereon processor-executable software instructions configured to cause a controller to perform operations comprising:
- determining a power level of each of a plurality of signals received at a head-end device from a client device, wherein each of the plurality of signals is received from one of a plurality of client devices;
- determining a difference between the power level of each received signal and a target power level; and
- adjusting the power level of each received signal individually at the head-end device based on the determined difference of each signal.

* * * * *